United States Patent [19]
Bandimere et al.

[11] Patent Number: 5,662,065
[45] Date of Patent: Sep. 2, 1997

[54] ANIMAL BED AND METHOD OF USING SAME

[75] Inventors: John K. Bandimere, Carlsbad; Randall S. Koch, San Diego, both of Calif.

[73] Assignee: Randall K., Inc., San Diego, Calif.

[21] Appl. No.: 497,436

[22] Filed: Jun. 30, 1995

[51] Int. Cl.$^6$ .................................................. A01K 1/035
[52] U.S. Cl. .................................................. 119/28.5
[58] Field of Search ............................. 119/28.5, 526, 119/651; 297/462; 5/122, 129

[56] References Cited

U.S. PATENT DOCUMENTS

| | | | |
|---|---|---|---|
| 633,111 | 9/1899 | Bartlett | 5/122 X |
| 2,032,248 | 2/1936 | Bins | 119/28.5 X |
| 3,125,663 | 3/1964 | Hoffman | 119/28.5 X |
| 3,846,551 | 11/1974 | Mifune et al. | 514/58 |
| 5,197,411 | 3/1993 | Schwarzenbart | 119/28.5 |
| 5,320,066 | 6/1994 | Gunter | 119/28.5 |
| 5,490,478 | 2/1996 | Cole | 119/28.5 |

*Primary Examiner*—Robert P. Swiatek
*Assistant Examiner*—Elizabeth Shaw
*Attorney, Agent, or Firm*—Bernard L. Kleinke; Peter P. Scott

[57] ABSTRACT

An animal bed includes an annular bed frame defining an interior chamber. A perforated top wall is supported at its periphery by the bed frame to receive and support the animal above the chamber. The perforated top wall is composed of a non-woven fabric material to provide a hammocklike suspension for the animal, and to permit small insects to fall through the top wall. The chamber is dimensioned to provide a space below the top wall sufficient to inhibit the insects from travelling upwardly through the top wall. An insect exterminating composition contained within the chamber receives the falling insects and destroys them.

18 Claims, 1 Drawing Sheet

U.S. Patent  Sep. 2, 1997  5,662,065
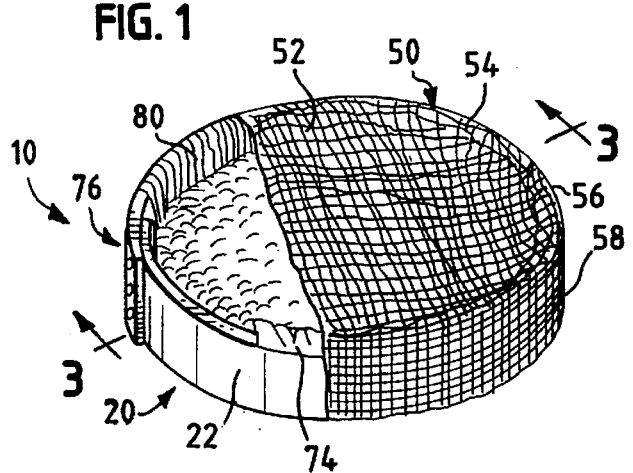
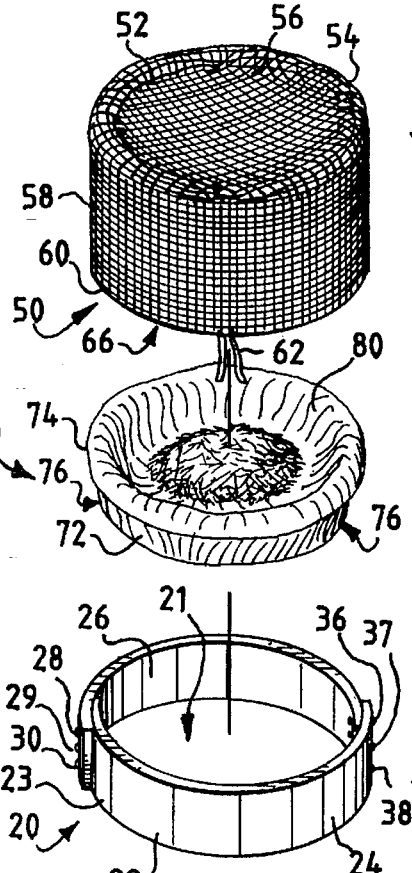
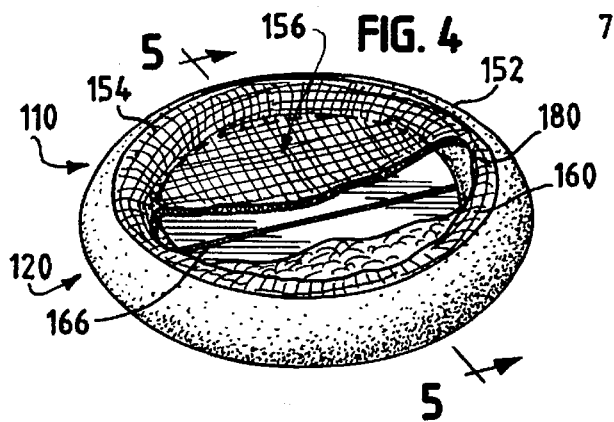
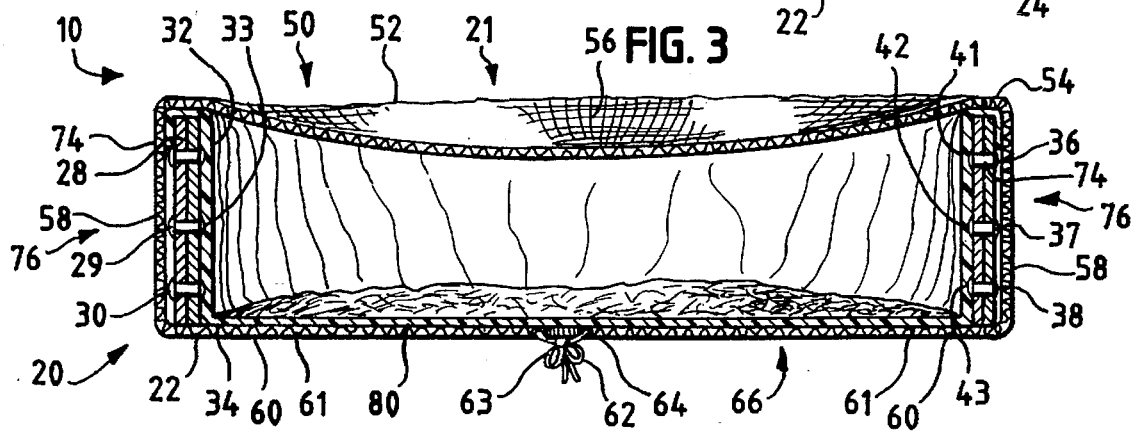
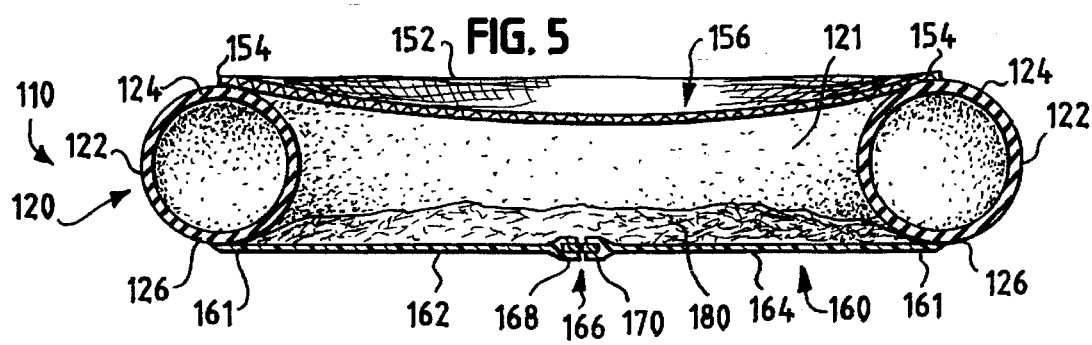

5,662,065

ANIMAL BED AND METHOD OF USING SAME

TECHNICAL FIELD

The present invention relates in general to an improved animal bed and a method of using it. The invention more particularly relates to an animal bed which comfortably supports an animal while facilitating the removal of small insects therefrom, and which can be used according to a novel method.

BACKGROUND ART

There have been many types of animal beds for supporting an animal in a comfortable manner. For example, reference may be made to the following U.S. Pat. Nos. U.S. Pat. No. 3,902,456; and 5,002,014.

U.S. Pat. No. 3,902,456, which is incorporated by reference as if fully set forth herein, describes a pet pillow having a doughnut shaped side wall portion defining an interior recess. The side wall portion is constructed from a fur-like synthetic material and is filled with a polyester fiber filling. A disc shaped bottom pad, which is also filled with the polyester fiber filling, extends across the bottom of the recess to provide additional cushioning for the animal.

In use, the animal rests within the recess. The polyester fiber filling within the side wall portion and the bottom pad supports the animal above the ground. Although such a pet pillow may permit the animal to rest comfortably, the pillow tends to accumulate small insects such as fleas and ticks. These small insects cause a great deal of discomfort to be inflicted on the animal, and can be easily transferred from the pillow to the animal while the animal is resting on the pillow.

To alleviate the problems associated with the accumulation of the small insects on the pillow, yet still provide a comfortable sleeping surface for the animal, an animal mattress which inhibits the accumulation of the small insects was developed. U.S. Pat. No. 5,002,014, which is incorporated by reference as if fully set forth herein, describes such an animal mattress.

The animal mattress includes an outer casing made of a woven, mesh fabric coated with a polyvinyl chloride material. A cushioning material composed of a plurality of small polystyrene beads fills the interior of the outer casing. The polystyrene beads flow within the casing under the weight of the animal to conform to the body of the animal, thereby enabling the animal to be supported without uncomfortable pressure points.

As the animal mattress is made entirely from inorganic materials, the small insects are deprived of nourishing substances that would otherwise accumulate on the mattress. Without the nourishing substances, the population of the small insects in the mattress could be reduced.

While such an animal mattress may reduce the number of small insects that can survive within the mattress, the mattress does not address the transference of the small insects from the mattress back to the animal. In this regard, the animal rests directly on the mattress, causing the beads to flow within the mattress. The beads are dispersed within the mattress to enable the mattress to closely conform to the shape of the animal. As a result, the animal rests in close proximity to the beads where the small insects tend to congregate. Thus, the insects can easily move from the beads to the resting animal.

Therefore, it would be highly desirable to have a new and improved animal bed which provides a comfortable and supportive resting platform for the animal, which prevents small insects within the bed from relocating to the animal, and which can be easily used. Such an animal bed should be lightweight, easy to assemble, and relatively inexpensive to manufacture.

DISCLOSURE OF INVENTION

Therefore, the principal object of the present invention is to provide a new and improved animal bed and a method of using it, wherein the animal bed provides a comfortable and supportive resting platform for the animal, prevents small insects within the bed from relocating to the animal, and which is lightweight, easy to assemble, and relatively inexpensive to manufacture.

Briefly, the above and further objects of the present invention are realized by providing a new and improved animal bed, which can be used according to a novel method of the present invention.

The animal bed includes an annular bed frame defining an interior chamber. A perforated top wall is supported at its periphery by the bed frame to receive and support the animal above the chamber. The perforated top wall is composed of a non-woven fabric material to provide a hammocklike suspension for the animal, and to permit small insects to fall through the top wall. The chamber is dimensioned to provide a space below the top wall sufficient to inhibit the insects from travelling upwardly through the top wall. An insect exterminating composition contained within the chamber receives the falling insects and destroys them.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a cut-away perspective view of an animal bed which is constructed in accordance with the present invention;

FIG. 2 is an exploded perspective view of the animal bed of FIG. 1 schematically illustrating the components of the bed prior to assembling the bed;

FIG. 3 is an enlarged cross-sectional view of the bed of FIG. 1 taken along the line 3—3 of FIG. 1;

FIG. 4 is a cut-away perspective view of another animal bed, which is also constructed in accordance with the present invention; and FIG. 5 is an enlarged cross-sectional view of the bed of FIG. 4 taken along the line 4—4 of FIG. 4.

BEST MODE FOR CARRYING OUT THE INVENTION

Referring now to the drawings, and more particularly to FIGS. 1–3 thereof, there is shown an animal bed 10 for supporting an animal (not shown) above a supporting surface (not shown), which is constructed in accordance with the present invention. The bed 10 can be easily used in accordance with the method of the present invention.

The bed 10 generally comprises a rigid annular bed frame 20 for defining an interior chamber 21. A covering 50 is sized and dimensioned to receive the bed frame 20 for helping to support the animal above the chamber 21. In a relaxed state, the covering 50 is generally pliable for receiving the bed frame 20 therewithin. Stretching the covering 50 taught draws the covering 50 tightly around the bed frame 20 to form an annular side wall 58 for engaging snugly the bed frame 20 and a top wall 52 having a periphery 54 for supporting the animal above the chamber 21.

The top wall 52 is supported at its periphery 54 by the bed frame 20, and is substantially slack even when the covering 50 is taught. In this way, the top wall 52 is dished and forms a recess 56 to suspend the animal above the chamber 21 in a comfortable hammocklike manner. The top wall 52 further facilitates the comfort of the animal by being perforate or mesh and constructed from a non-woven fabric material to permit small insects such as fleas and ticks (not shown) carried by the animal to fall through the top wall 52 and into the chamber 21, wherein the insects are substantially inhibited from returning to the animal.

The side wall 58, as shown in FIGS. 1–3, is constructed of pliable perforate material substantially similar to the construction of the top wall 52, and is integrally connected thereto. However, the side wall 58 could be constructed from a another material, such as canvas, and sewn or otherwise attached to the top wall 52. The use of a material, such as canvas, to construct side wall 58 will adequately enable the side wall 58 to engage snugly the bed frame 20 as desired, and can be used to add color to the bed 10 to make it more attractive.

An open top receptacle 70 is disposed below the top wall 52 within the chamber 21 to receive the insects which fall through the top wall 52. The receptacle 70 is preferably constructed from a pliable inexpensive plastic material which can be readily disposed of at the end of its useful life, or can be recycled for continued use with the bed 10. The receptacle 70 includes a main body portion 72 which substantially encloses the chamber 21, and a top portion 74 for engaging the bed frame 20 to support the receptacle 70 therefrom. In this regard, the top portion 74 is folded over and away from the main body portion 72 to form an annular recess 76 to receive the annular bed frame 20.

Position within the chamber 21, and contained in the receptacle 70, is an insect exterminating mixture 80 for destroying the fallen insects which are received in the receptacle 70. The mixture 80 is non-toxic and includes a combination of cedar chips and diatomaceous earth to enhance the exterminating ability of the mixture 80 and to exude a pleasant aromatic fragrance. The cedar chips tend to annoy the insects, causing them to be very active in trying to avoid the cedar chips. In addition, the cedar chips produce a pleasant odor, thereby masking any unpleasant odors associated with the animal, such as the odor produced by wet fur.

The diatomaceous earth acts as a pesticide to lacerate or otherwise mortally injure the small insects for destroying them and to prevent the accumulation of such insects within the chamber 21. The effects of the diatomaceous earth are enhanced by the cedar chips as the insects become more active in the presence of the cedar chips. The active insects are prone to receiving substantial injuries from the diatomaceous earth as they attempt to avoid the cedar chips. Other insect destroying material may be employed, either in place of, or in addition to the diatomaceous earth, in sufficient quantity to destroy the insects. For example, a filter media known as "PERLITE" is a volcanic glass may be employed as a pesticide. Also, ground flower powder substance marketed under the tradename "PYRETHRUM" can be purchased from OB People's National Foods Co-op, located in Ocean Beach, California, and may be employed as an insect destroying agent in the form of a pesticide. The ground flower powder substance is also known as African Daisy, which is *Chrysanthemum cinerarialbolium*. The active ingredient is Pyrethrum, which is a stomach poison that passes directly through the cuticle of insects for killing them quickly.

The mesh top wall 52 permits other materials such as loose hair, dirt, moisture and other foreign material to fall therethrough to maintain the bed 10 in a clean and sanitary condition.

In use, a sufficient quantity of cedar chips for increasing the activity of the insects and to provide a pleasant aroma are combined with a sufficient quantity of diatomaceous earth to lacerate or injure the active insects to form the mixture 80. The mixture 80 is placed within the receptacle 70, resting on the main body portion 72. The receptacle 70 is positioned within the chamber 21, and the top portion 74 is folded down and away from the main body portion 72 to form the annular recess 76. The bed frame 20 is received within the recess 76 to support the receptacle 70, wherein the main body portion 72 is within the chamber 21 and the top portion 74 is outside of the chamber 21.

The bed frame 20, receptacle 70 and mixture 80 are then enclosed by the relaxed covering 50. The covering 50 is drawn tightly about the bed frame 20 to form the top wall 52 and the side wall 58. The covering 50 is made taught enough to enable the top wall 52 to support the weight of the animal, yet the covering remains partially relaxed to enable the top wall 52 to be slack and dished for providing hammocklike suspension of the animal. At the same time, the side wall 58 is drawn tightly about the bed frame 20, thereby frictionally holding the top portion 74 between the bed frame 20 and the side wall 58 to maintain the receptacle 70 within the chamber 21.

The animal can then rest on the top wall 52 in a comfortable manner, whereby the small insects which may be carried by the animal are permitted to fall through the top wall 52 into the chamber 21 and the awaiting mixture 80.

When desired, the mixture 80 may be removed from the animal bed 10. In this regard, the receptacle 70 is removed from within the chamber 21 by following the method described above in reverse. The receptacle 70 and the mixture 80 can then be quickly and conveniently disposed of.

Considering now the bed frame 20 in greater detail, the bed frame 20 is formed by a pair of elongated rigid members 22 and 26 coupled to one another. As frame members 22 and 26 are substantially similar to one another, only frame member 22 will be considered hereinafter in greater detail. The frame member 22 includes a left end 23 having openings 32–34 therein. Similarly, the frame member 22 includes a right end having openings 41–43 therein.

To couple the frame members 22 and 26 to one another, the openings 32–34 and 41–43 of the frame member 22 are aligned with similarly situated openings (not shown) in the frame member 26. Fasteners 28–30 and 36–38 are passed through openings 32–34 and 41–43, respectively, and the corresponding openings in frame member 26, to removably couple the frame member 22 to the frame member 26. The fasteners 20–30 and 36–38 are preferably nut and bolt combinations to enable the frame members 22 and 26 to be connected and disconnected from one another in a relatively easy manner. It will be understood by one skilled in the art that other types of fasteners can also be used, and still enable the bed frame 20 to be assembled and disassembled easily. It will also be understood that the frame members 22 and 26 may be permanently fastened together and still be within the contemplated present invention.

As best seen in FIGS. 1 and 2, the bed frame 20 includes two frame members, frame members 22 and 26. A bed frame could also be constructed from a single frame member coupled at both of its ends, or by a single annular frame member integrally connect to form a continuous frame or ring. Other possible bed frames could be formed by more than two frame members. All of the frames Just described will provide an adequate frame for the bed 10, and are within the scope of the contemplated invention.

Considering now the covering 50 in greater detail, the side wall 58 thereof further includes an annular edge 60 forming an opening 66 to receive the bed frame 20, the receptacle 70 and the insect exterminating mixture 80. A channel portion 61 coupled to the edge 60 facilitates reducing the diameter size of the opening 66 to cause the covering 50 to become taught. In this regard, a cord 62 is contained within the channel 61, and extends out of the channel 61 via openings 62 and 64. The cord 62 may be drawn out of the openings 63 and 64 to reduce the diameter of the opening 66, wherein the edge 60 is drawn inwardly to enclose the bed frame 20 within the opening 66.

As a result of the covering 50 being made taught by the cord 62 being drawn out of the openings 63 and 64 to reduce the diameter of the opening 66, the side wall 58 is drawn tightly against the bed frame 20 as the edge 60 is drawn inwardly toward the chamber 21. However, the covering 50 is not made so taught that the top wall 52 becomes flat and rigid, similar to a drum head. Instead, the top wall 52 remains substantially slack to provide a hammocklike suspension for the animal.

In order to inhibit the insects that have fallen into the chamber 21 from travelling upwardly through the top wall 52 to return to the animal, the covering 50 is tightened to position the top wall 52 adequately above the chamber 21, yet the top wall 52 remains substantially slack and dished. As a result, a sufficient amount of space within the chamber 21 is provided below the top wall 52 and above the supporting surface to enable the animal to be supported in a spaced apart manner from the mixture 80, thereby reducing the ability of the insects to reach the animal.

Once the cord 62 has been drawn through the openings 63 and 64 to reduce the diameter size of the opening 66, the cord 62 is tied into a knot for maintaining the desired diameter size. A quick release mechanism may also be used to secure the ends of the cord 62. As a result of securing the cord 62, the diameter size of the opening 66 is substantially fixed with the edge 60 substantially held in an inward position from the bed frame 20. Due to the inward positioning of the edge 66, the bed frame 20 is held within the covering 50 by the edge 66.

The support of the animal is thus enhanced by securing the covering 50 with the edge 66 in the inward position. In this regard, the weight of the animal tends to cause the side wall 58 to move upwardly relative to the bed frame 20. By securing the cord 62 to maintain the edge 66 at the inward position, the upward movement of the side wall 58 is substantially limited. In addition, the combined weight of the animal and the bed 10 presses down on the edge 66, wherein the edge 66 is held frictionally between the bed frame 20 and the supporting surface, further limiting the ability of the side wall 58 to move upwardly relative to the bed frame 20.

Referring now to the drawings and more particularly to FIGS. 4 and 5, there is shown another animal bed 110 for supporting the animal above the supporting surface, which is also constructed in accordance with the present invention.

The animal bed 110 includes a substantially rigid annular bed frame 120 which defines an interior chamber 121. The bed frame 120 includes a single wall inflatable tube 122 of circular cross-section and having a top portion 124 and a lower portion 126. An inflation valve (not shown) enables the tube 122 to be inflated, wherein the tube 122 expands to help support the animal and to define the chamber 121.

A perforated top wall 152, which is substantially similar to the top wall 52 (FIGS. 1–3), is connected at its periphery 154 to the upper portion 124 for supporting the animal above the chamber 121, and to permit insects carried by the animal to fall through the top wall 152. The top wall 152 is connected to the top portion 124 by heat welding or by other conventional securing methods.

The top wall 152 is substantially slack and dished to define a recess 156 for providing hammock-like suspension for the animal. In this regard, the bed frame 120 is inflated to expand the wall 122, thereby defining the chamber 121 and providing a supporting structure for the top wall 152. Inflating the bed frame 120 also stretches the top wall 152, wherein the top wall 152 is held above the chamber 121 to provide sufficient amount of space between the top wall 152 and the supporting surface for comfortably supporting the animal and for inhibiting the insects from travelling upwardly from the chamber 121 through the top wall 152.

A bottom wall 160 is secured at its periphery 161 to the lower portion 126 by heat welding or other conventional securing techniques. The bottom wall 160 includes a left section 162 and a right section 164 connected to one another by a sliding fastener 166. The bottom wall 160 is pliable and preferably constructed from a vinyl plastic sheet for greater resistance to accidental damage from contacting sharp or abrasive objects on the supporting surface.

The sliding fastener 166 includes a left portion 168 coupled to the left section 162, and a right portion 170 coupled to the right section 164 for selectively providing access to the interior chamber 121. The sliding fastener 166 can be moved along the length of the left portion 168 and the right portion 170 to selectively secure the portions 168 and 170 to one another for preventing access to the chamber 121, or to separate the portions 168 and 170 for enabling the chamber 121 to be easily accessed.

An insect exterminating mixture 180, which is substantially similar to the mixture 80 (FIGS. 1–3), is disposed within the chamber 121 for destroying insects which fall through the top wall 152 from the animal resting thereon. To access the chamber 121 to remove or insert the insect exterminating mixture 180, the sliding fastener 166 is operated to separate the left section 162 from the right section 164.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A bed for an animal, comprising:

substantially rigid annular bed frame means defining an interior chamber;

an animal supporting pliable perforated top wall supported at its periphery by said bed frame means for receiving and supporting the animal above said chamber, said perforated top wall being slack and dished to form a recess for receiving and supporting the animal;

wherein said perforated top wall is composed of a non-woven fabric material to provide a hammocklike suspension for the animal in a comfortable manner, and wherein said perforated top wall permits small insects carried by the animal to fall therethrough into said chamber; and said chamber being dimensioned to provide a sufficient space below said perforated top wall to suspend the animal comfortably above a supporting surface and to inhibit small insects from travelling upwardly through said perforated top wall.

2. A bed according to claim 1, further including an insect exterminating composition disposed within said chamber for killing said insects.

3. A bed according to claim 2, further including a removable open top receptacle disposed below said perforated top wall for containing said insect exterminating composition within said chamber and for receiving said insects to help remove them permanently from the animal.

4. A bed according to claim 3, further including an annular side wall having an edge defining an opening connected to said perforated top wall periphery for receiving and engaging snugly said bed frame means to help retain said open top receptacle within said chamber;

said open top receptacle includes a main body portion for receiving said insect exterminating composition and a top portion folded over and away from said main body portion to form an annular cavity for receiving said bed frame means to help support said open top receptacle from said bed frame means; and wherein said top portion is held frictionally between said bed frame means and said side wall.

5. A bed according to claim 4, wherein said side wall further includes a cord coupled to said edge for enabling the diameter of said opening to be reduced to help prevent said side wall from moving relative to said bed frame means; and wherein said edge extends inwardly from said side wall to retain said bed frame means within said side wall and said top wall for helping to support said top wall by said bed frame means.

6. A bed according to claim 5, wherein said bed frame means includes at least one rigid elongated side member having a pair of end portions, said side member being secured releasably at said end portions to help form said annular bed frame means.

7. A bed according to claim 2, further including a pliable bottom wall connected at its periphery to said bed frame means below said chamber for receiving said insect exterminating composition.

8. A bed according to claim 7, wherein said bottom wall has a right section and a left section, said bottom wall including a sliding fastener coupled to said right section and said left section to enable said right section and said left section to be separated from one another for providing access to said chamber.

9. A bed according to claim 8, wherein said annular bed frame means includes a single wall tube member having a substantially circular cross section.

10. A method of using an animal bed, comprising:

using a substantially rigid annular bed frame means having an annular bed frame means defining an interior chamber;

supporting an animal supporting perforated pliable top wall at its periphery by said bed frame means for receiving and supporting the animal above said chamber, said top wall being slack and dished to form a recess for receiving and supporting the animal;

providing hammocklike suspension for the animal in a comfortable manner;

permitting small insects carried by the animal to fall through said perforated top wall into said chamber; and providing a sufficient space below said perforated top wall to suspend the animal comfortably above a supporting surface and to inhibit small insects from travelling upwardly through said perforated top wall.

11. A method according to claim 10, further including disposing an insect exterminating composition within said chamber for killing said insects.

12. A method according to claim 11, further including disposing a removable open top receptacle below said perforated top wall for containing said insect exterminating composition within said chamber and for receiving said insects to help remove them permanently from the animal.

13. A method according to claim 12, further including using an annular side wall having an edge defining an opening connected to said perforated top wall periphery for receiving and engaging snugly said bed frame means to help retain said open top receptacle within said chamber;

forming an annular cavity between a top portion of said open top receptacle and a main body portion of said open top receptacle for receiving said bed frame means therein to help support said open top receptacle from said bed frame means; and holding frictionally said top portion between said bed frame means and said side wall.

14. A method according to claim 13, further including reducing the diameter of said opening with a cord coupled to said edge to help prevent said side wall from moving relative to said bed frame means, wherein said edge extends inwardly from said side wall to retain said bed frame means within said side wall and said top wall for helping to support said top wall by said bed frame means.

15. A method according to claim 14, further including securing releasably an elongated side member having a pair of end portions at said end portions to help form said annular bed frame means.

16. A method according to claim 11, further including connecting a pliable bottom wall at its periphery to said bed frame means below said chamber for receiving said insect exterminating composition.

17. A method according to claim 16, further including separating a right section of said bottom wall from a left section of said bottom wall with a sliding fastener to provide access to said chamber.

18. A method according to claim 17, further including inflating a single wall tube member having a substantially circular cross section to help form said bed frame means.

* * * * *